United States Patent [19]

Christophliemk et al.

[11] Patent Number: 4,499,062
[45] Date of Patent: Feb. 12, 1985

[54] HYDROTHERMAL DECOMPOSITION OF ALUMINUM SILICATES

[75] Inventors: Peter Christophliemk; Rudolf Novotny, both of Düsseldorf; Jürgen von Laufenberg, Haan; Josef Sadlowsky, Düsseldorf, all of Fed. Rep. of Germany

[73] Assignee: Henkel Kommanditgesellschaft auf Aktien, Duesseldorf, Fed. Rep. of Germany

[21] Appl. No.: 499,037

[22] Filed: May 27, 1983

[30] Foreign Application Priority Data

Feb. 3, 1983 [DE] Fed. Rep. of Germany ....... 3303515

[51] Int. Cl.³ ................................................ C01B 33/32
[52] U.S. Cl. .................................... 423/332; 423/118; 423/131; 423/328; 423/334; 423/326
[58] Field of Search ............... 423/326, 327, 328, 332, 423/131, 118

[56] References Cited

U.S. PATENT DOCUMENTS 2,297,628  9/1942  McGregor ........................... 423/332
3,436,174  4/1969  Sand .................................... 423/328
3,838,192  9/1974  Bertorelli et al. .................. 423/332
4,081,514  3/1978  Sand et al. .......................... 423/328

FOREIGN PATENT DOCUMENTS 2017745  5/1970  France ................................. 423/328
  63367  8/1968  German Democratic Rep. ..................................... 423/328
1218883  1/1971  United Kingdom ................ 423/328

Primary Examiner—John Doll
Assistant Examiner—Steven Capella
Attorney, Agent, or Firm—Ernest G. Szoke; Henry E. Millson; Mark A. Greenfield

[57] ABSTRACT

A process for the hydrothermal fusion of aluminum silicate and alkali aluminum silicates with aqueous sodium hydroxide solution under pressure and at elevated temperatures in the presence of soluble silicates, in which an aqueous solution containing from about 20 to about 50% by weight of NaOH is mixed with aluminum silicates and/or alkali aluminum silicates, and with a hydrothermally fusible silicate component, wherein the ratio by weight of $SiO_2$ to $Al_2O_3$ in the mixture amounts to at least 30:1 and the ratio by weight of $SiO_2$ to $Na_2O$ amounts to at least 1.5:1, and the mixtures are reacted at temperatures of from about 180° to about 250° C. and under the saturated steam pressures corresponding to those temperatures. The resulting sodium silicate solution, which contains the dissolved aluminum, is then separated off.

11 Claims, 2 Drawing Figures

HYDROTHERMAL DECOMPOSITION OF ALUMINUM SILICATES

BACKGROUND OF THE INVENTION

This invention relates to a process for the hydrothermal decomposition of aluminum silicates and alkali aluminum silicates with aqueous sodium hydroxide solution under pressure and at elevated temperatures in the presence of a large excess of silicates which are soluble under these hydrothermal conditions.

Both mineral aluminum silicates and alkali aluminum silicates and also the technically preferred synthetic aluminum silicates and alkali aluminum silicates are sparingly soluble in aqueous sodium hydroxide solution, even under pressure and at elevated temperatures. Accordingly, compounds such as these are for the most part commercially produced by hydrothermal techniques. To this end, an aqueous silicate solution containing free alkali and an aluminate solution likewise containing free alkali are combined, resulting immediately in the precipitation of a corresponding alkali aluminum silicate at temperatures above room temperature. Even when this suspension containing excess alkali is subsequently subjected to hydrothermal aftertreatment at temperatures of the order of 200° C. and higher, for example for the purpose of crystallization or recrystallization, the solid is not dissolved to any significant extent. The sum total of dissolved silicate and dissolved aluminate always amounts to distinctly less than 1% by weight. It is precisely this stability of aluminum silicates and alkali aluminum silicates with respect to alkaline solutions which is commercially utilized for filtering aqueous alkali silicate solutions, despite their occasionally very high alkali content, at temperatures of the order of 100° C. and higher using fixed-bed filters with filter aids based on aluminum silicate. On completion of this filtering operation, the so-called filter sludge of filter aids and the insoluble constituents of the solution to be filtered has hitherto been discarded, i.e. pretreated and/or dumped at considerable expense. Similarly, industrial waste products based on alkali aluminum silicate, of the type which can accumulate for example through defective crystallization or even as operationally unavoidable secondary products in the synthesis of molecular sieves, have hitherto always had to be dumped, generally through lack of any commercial value.

DESCRIPTION OF THE INVENTION

Figure 1:
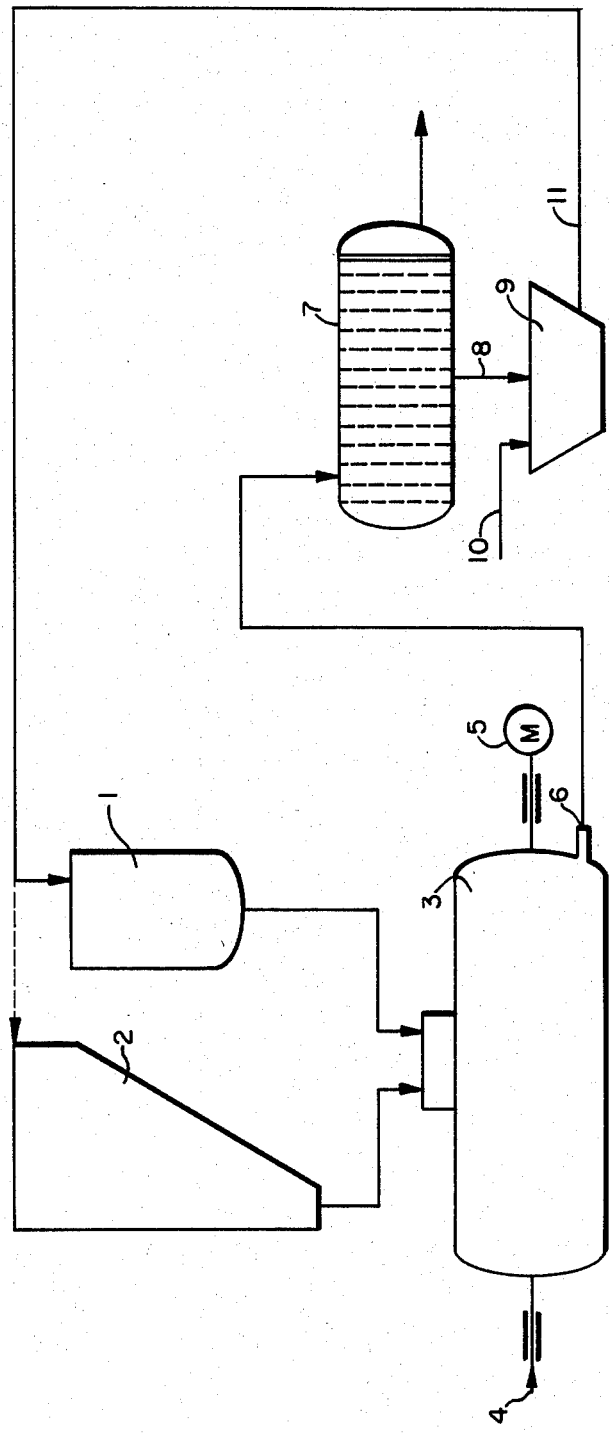
FIG. 1 sets forth in schematic form a flow chart of one embodiment of the present process.

An object of the present invention is to develop a process for the ecologically and economically advantageous utilization of filter sludge containing aluminum silicate and/or alkali aluminum silicate, in which the disadvantages referred to above are avoided. Another object of the invention is to obtain as high a volume/time yield as possible for as low an energy consumption level as possible in the hydrothermal decomposition process.

It has now surprisingly been found that the aluminum silicates and alkali aluminum silicates present in the above-mentioned residues can be dissolved completely or substantially completely in the presence of a large excess of dissolved or soluble silicates using an economic process suitable for large scale use. The resulting sodium silicate solution, which contains a small amount of dissolved aluminate, may then be used for further chemical reactions. The high commercial value of the dissolved aluminate can be utilized with particular advantage by using sodium silicate solutions of this type as the silicate component in the production of molecular sieves.

Accordingly, the present invention relates to a process for the hydrothermal decomposition of aluminum silicates and alkali aluminum silicates with aqueous sodium hydroxide solution under pressure and at elevated temperature in the presence of soluble silicates. In the process of the invention, an aqueous solution containing from about 20 to about 50% by weight of NaOH is mixed with aluminum silicates and/or alkali aluminum silicates and with a hydrothermally decomposable silicate component, wherein the ratio by weight of $SiO_2$ to $Al_2O_3$ in the resulting mixture amounts to at least 30:1 and the ratio by weight of $SiO_2$ to $Na_2O$ to at least 1.5:1. The mixture is then reacted at temperatures of from about 180° to about 250° C. under the saturated steam pressures corresponding to those temperatures, and the sodium silicate solution which accumulates and which contains the dissolved aluminum, in the form of aluminate is separated off.

It is best to filter the accumulated sodium silicate solution. The hydrothermally decomposable silicate component used for the purposes of the invention is silica and/or sand and/or dissolved or hydrothermally decomposable sodium silicate. The ratio of $SiO_2$ to $Al_2O_3$ can be quite high, and preferably amounts to between about 50:1 and about 150:1. If the ratio of $SiO_2$ to $Al_2O_3$ in the mixture as a whole is reduced to a value significantly below 30:1, the hydrothermally decomposable percentage of aluminum silicate or alkali aluminum silicate decreases appreciably.

In the following description, the expression "filter sludge" is to be understood to apply to residues containing filter aids and, optionally, other undissolved components of high silicate content which accumulate in large quantities on an industrial scale, in which the pure, anhydrous filter aid itself contains from about 10 to about 30% by weight of $Al_2O_3$ and from about 50 to about 85% by weight of $SiO_2$, and the solids as a whole contain at least about 3% of $Al_2O_3$.

However, the expression "filter sludge" used in the following description is also to be understood to include zeolitic or feldspartic alkali aluminum silicates accumulating as waste and containing from about 15 to about 38% of $Al_2O_3$ and from about 42 to about 75% of $SiO_2$, based on the anhydrous substance.

For economic reasons, it is best not to dissolve the filter sludges in the presence of sodium silicates which have already been almost completely dissolved, i.e. for example in technical waterglass solution. Instead, it is preferred to use solid, hydrothermally decomposable silicate components, such as silica or, more especially, quartz sand, so that the capacity of the hydrothermal reactor is fully utilized. For this reason, significant advantages are afforded by combining the process according to the invention with the hydrothermal process for producing sodium silicate solution from quartz sand and sodium hydroxide.

In the filtration of technical waterglass solutions, filter aids based on alkali silicates are normally "consumed" in quantities of from 1 kg to 3 kg per ton of alkali silicate solution, i.e. on completion of filtration, they are discharged with other filter residues from the filtration unit and, after pretreatment to reduce an otherwise excessive residual alkali content, are stored in dumps.

While retaining optimal conditions for the hydrothermal production of sodium silicate, the process according to the invention makes it possible to reduce the amount of filter sludge accumulating in this process, in some cases to far less than 10%, based on the quantity of filter sludge which would otherwise accumulate, depending upon the type and quantity of filter aid/filter sludge and upon the type and quantity of metal ions forming sparingly soluble silicates which are present in the filter aid and in the sand.

If filter sludges do not accumulate in sufficient quantities in the hydrothermal process, other sludges of appropriate composition, such as for example filter sludges of non-hydrothermally produced waterglass solutions or waste from the production of molecular sieves, can also be used in accordance with the invention.

In order to obtain significant dissolution both of the filter sludge and of the main silicate component, such as, preferably, sand, in an economic volume/time yield, it is necessary to apply reaction temperatures of at least about 180° C. for alkali concentrations in the solution of at least about 20% by weight of NaOH. According to the invention, however, it is preferred for operation on an industrial scale to apply reaction temperatures in the range of from about 200° to about 210° C. for alkali concentrations of from about 25 to about 35% by weight of NaOH. Under these conditions, filter sludge having the same composition for example as that indicated above can be dissolved almost completely in 60 minutes in a quantity of up to 5% by weight, based on the total quantity of silicate.

Although the reaction time required for dissolving filter sludge and sand can be shortened by increasing the temperature, it is best when carrying out hydrothermal reactions on an industrial scale not to exceed reaction temperatures of about 250° C. and alkali concentrations of about 50% by weight of NaOH in the solution. To obtain a rapid reaction, all the solids should be introduced in as finely divided a form as possible. The reaction mixture is kept in motion at least to the extent needed to prevent the finely suspended solid from forming a sediment. If the solution formed on completion of the hydrothermal reaction contains significant residues of the solid components used, it may have to be filtered, depending on the purpose for which it is intended.

Insofar as the industrial application of the process according to the invention is concerned, it is crucially important that the parameters of the hydrothermal decomposition process should fit into the hydrothermal production of sodium silicate from sand and sodium hydroxide. Dissolution of the filter sludge takes place as a kind of secondary reaction alongside the reaction of the main silicate component without any significant changes in the most important process steps. The basic prerequisites for this are embodied in the process according to the invention in the fact that, in the reaction of the filter sludge and in the hydrothermal production of sodium silicate, the reaction temperature and reaction time on the one hand and the optimal concentration of sodium hydroxide on the other hand are largely the same for the purposes of large-scale operation.

Accordingly, the process according to the invention may generally be carried out using any of the reaction vessels or reactors commonly used for hydrothermal high-pressure syntheses, such as for example rotating or static autoclaves and also tube reactors, particularly those of the type which have already been commercially used for the hydrothermal production of sodium silicate from sand and sodium hydroxide.

The formation and use of filter layers of filter aids in industrial filter units are well known.

On completion of filtration, the layers of filter sludge left behind on the sieve plates are removed from the sieve plates and collected in containers or other suitable vessels to be taken away. Depending on the filtration technique applied and upon the washing operations carried out after filtration for washing out the filter sludge, the filter sludge has a solids content of from about 20 to about 70%.

Depending on their consistency and water content, the filter sludges may be transported to the hydrothermal reactor by means of suitable conveyors, such as for example conveyor belts, screw conveyors or even pumps. It is possible in principle to introduce the filter sludge into the reactor itself, or into a separate storage vessel, or into the storage vessel for the alkali component, or even into the storage vessel for the sodium hydroxide. The method adopted in practice will depend upon local factors, for example upon the spatial arrangement with respect to the distance and difference in level between the hydrothermal reactor and the filter.

In one preferred embodiment of the invention, the hydrothermal reaction of filter sludge and silicate component is carried out in a rotating cylindrical pressure vessel mounted for rotation about its horizontal axis.

Referring now to FIG. 1, this figure relates to this embodiment of the process of the invention. Aqueous sodium hydroxide in storage vessel 1 and the silicate component e.g. sand, in storage vessel 2, together with filter sludge which can be present in either storage vessel, are introduced in batches into rotating reaction pressure vessel 3. The resulting aqueous solids/sodium hydroxide suspension reaction mixture is then heated to the desired reaction temperature in rotating reaction pressure vessel 3. This heating of the reaction mixture can be carried out both indirectly, for example by suitable heating elements (not shown) in reaction pressure vessel 3 or by jacket heating (not shown) thereof, and also directly by the introduction of steam into reaction pressure vessel 3 through steam inlet 4. To increase the heating rate, saturated steam is preferably introduced into the reaction mixture through steam inlet 4 until the desired reaction temperature is reached; the saturated steam pressure corresponding to that temperature simultaneously being established in reaction pressure vessel 3. Rotation of reaction pressure vessel 3 is accomplished by means of drive motor 5.

The reaction mixture is left under the temperature/pressure conditions established in rotating reaction pressure vessel 3 until a sample of the solution formed indicates that the desired $SiO_2$ concentration has been reached. The reaction times required to achieve this result can generally be empirically determined in the course of a few reactions. It is economically advantageous to carry out the entire hydrothermal reaction to the final $SiO_2$ concentration desired and then to terminate the reaction.

Rotating reaction pressure vessel 3 is then stopped and the aluminum-containing sodium silicate solution, which is still under pressure or which is restored to normal pressure, is transferred through outlet opening 6 in vessel 3 to settling filter 7 and filtered. On completion of filtration, the filter sludge is optionally subjected to brief washing and then discharged through outlet 8 into filter sludge collecting vessel 9. "External" filter sludges suitable for the purposes of the invention can also be introduced into collecting vessel 9 through inlet pipe 10. The filter sludges, to which a little water or sodium hydroxide can optionally be added, are then transported from filter sludge collecting vessel 9 into sand storage vessel 2 or sodium hydroxide storage vessel 1 by conveyor system 11. Unless the quantity of silicate hydrothermally produced and the quantity of filter sludge proportionally accumulating are in such an equilibrium that the entire aluminum silicate is dissolved in the filter sludge, there is a gradual enrichment of aluminate. Because the filter sludge is continuously recycled, only the $Al_2O_3$ content thereof increases at first, although ultimately the total quantity of filter sludge also increases. In addition, however, the hydrothermally non-decomposable heavy metal silicates also gradually accumulate to an increasing extent. Where the technically preferred sand and filter aid materials are used, however, these accumulations only become noticeable after the filter sludge has been recycled about 10 times. In individual instances, a check should be made after only a few recyclings to determine after how many cycles it would be of advantage in operational terms to completely discard the filter sludge.

In a second preferred embodiment of the invention, a stationary reaction vessel is used for the hydrothermal reaction. In this case, the liquid phase of the reaction mixture is pump-recirculated through a solid bed of filter sludge and silicate component introduced into the stationary reaction vessel, thereby forming a fluidized bed, and then through a bypass pipe positioned outside the reaction vessel. Temperatures in the reaction vessel are in the range of from about 180° to about 250° C., and preferably in the range of from about 200° to about 210° C., and under the saturated steam pressures corresponding to those temperatures, until the concentration of $SiO_2$ in the liquid phase has reached the desired value (see above).

This embodiment of the invention is based essentially on the formation of a fluidized bed of the reaction mixture in the actual reaction zone in which, as a result, a permanent and intensive mass transfer takes place between the reaction components on the one hand and the sodium silicate solution formed on the other hand. Compared with conventional hydrothermal processes carried out under otherwise the same conditions and for the same quantities of filter sludge and silicate component, the formation of this fluidized bed results both in a considerable reduction in the reaction time and also in high concentrations of $SiO_2$ in the solution formed.

Figure 2:
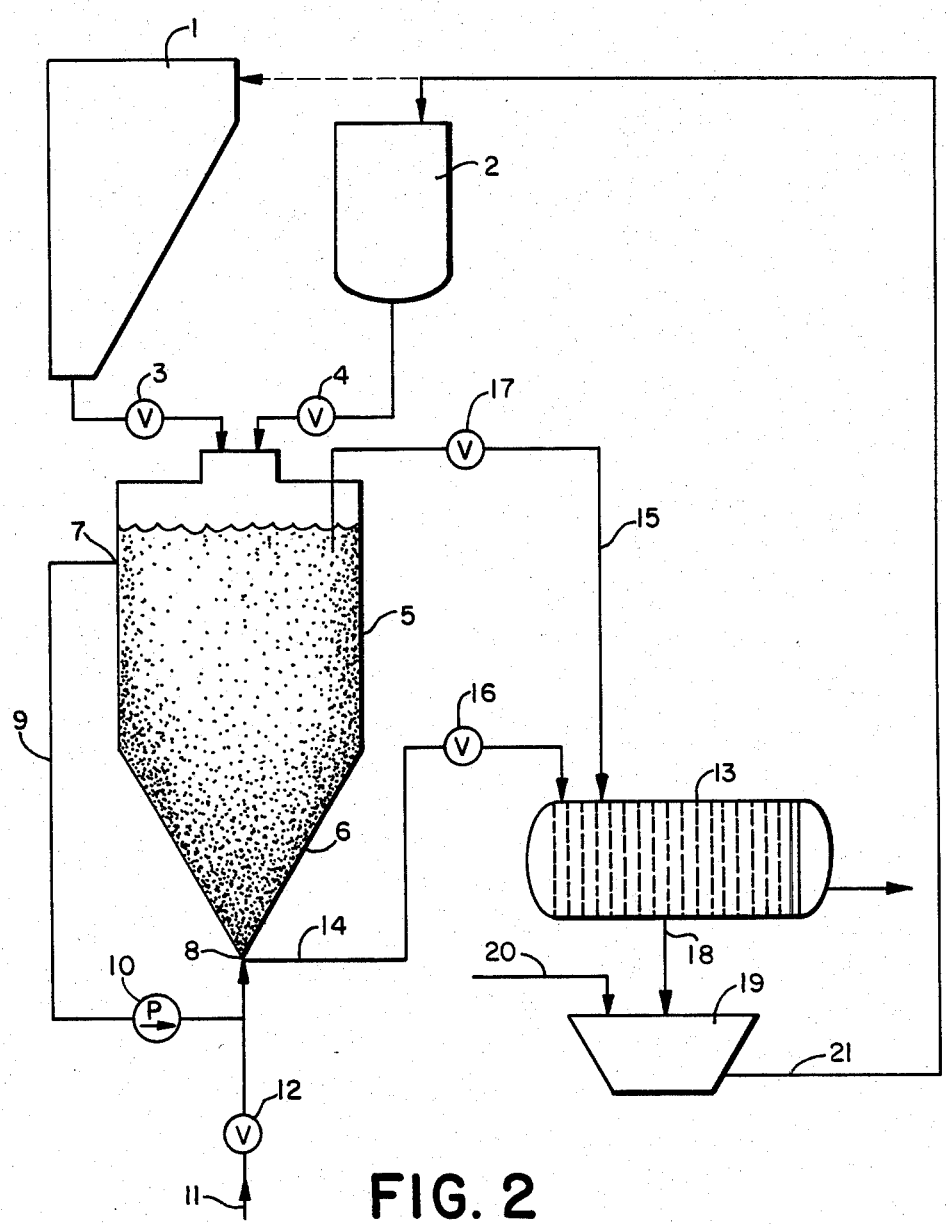
FIG. 2 sets forth in schematic form a flow chart of a second embodiment of the present process.

Referring now to FIG. 2, this figure shows in schematic form a flow chart of this second preferred embodiment of the process of the invention. The silicate component, preferably sand, filter sludge, and aqueous sodium hydroxide solution are introduced in batches from storage vessels 1 and 2 via metering valves 3 and 4 respectively into stationary reaction pressure vessel 5. The solids settle primarily in the lower, preferably conically shaped part 6 of the reaction vessel 5 in the form of a solid bed. To form the fluidized bed essential to the invention, this solid bed is fluidized and kept in a state of fluidization (fluidized bed) by continuous pump-recirculation of the liquid phase of the reaction mixture. To this end, the liquid phase is run off from the reaction vessel at its upper end 7 and introduced back into the vessel at its lower end 8 through a bypass pipe 9 positioned outside reaction vessel 5 and connected to pump 10 so that this stream of liquid always flows into the solid bed, or rather into the fluidized bed already formed, under pressure from below.

In the context of the invention, the term "liquid phase of the reaction mixture" is understood to include both the aqueous sodium hydroxide used and also the aluminate-containing sodium silicate solution formed during the reaction, although this solution may also contain parts of the fluidized solid components.

In this second embodiment, too, heating of the reaction mixture to the necessary reaction temperature is preferably carried out by the direct introduction of saturated steam into the reaction vessel, the steam being advantageously introduced into reaction vessel 5 at its lower end 8 through inlet 11 and metering valve 12. This technique enhances fluidization of the solid bed to form the fluidized bed essential to the invention. The reaction mixture can also be indirectly heated by suitable heating elements (not shown) in reaction vessel 5 or by jacket heating (not shown) thereof. If desired, bypass pipe 9 can also be provided with a suitable heating jacket (not shown). However, saturated steam is preferably introduced into the reaction mixture until the required reaction temperature is reached; the saturated steam pressure corresponding to that temperature being simultaneously established in reaction vessel 5.

In accordance with this embodiment of the invention, it is also preferred to carry out the reaction at temperatures in the range of from about 200° to about 210° C. and under the saturated steam pressures corresponding to those temperatures. The choice of a relatively low reaction temperature in this preferred range, in conjunction with the short reaction times obtainable in accordance with the invention, enables the reactions to be carried out with a low energy consumption level.

After the required reaction temperature has been reached, the reaction mixture is left under the temperature/pressure conditions established in reaction vessel 5 (while the liquid phase continues to be pump-recirculated) until a sample of the aluminate-containing solution indicates that the desired $SiO_2$ concentration has been reached. In this embodiment, too, the reaction times required to that end may generally be empirically determined in the course of a few reactions.

On completion of the reaction, the solution formed, which is still under pressure or is restored to normal pressure, is transferred to settling filter 13 through the pipes 14 or 15 using metering valves 16 or 17 respectively.

As in the first embodiment, the filter sludge then passes through outlet 18 in filter 13 into collecting vessel 19 from which it is returned, optionally together with other "external" filter sludges introduced into collecting vessel 19 through inlet pipe 20 to the hydrothermal reactor system by filter sludge conveyor 21.

This second preferred embodiment is also suitable for continuous operation. In this variation (not shown) the aluminate-containing sodium silicate solution formed is continuously discharged from the reaction vessel into which the reaction components are continuously introduced. In this variation, the introduction of solid components and sodium hydroxide into the stationary reaction vessel is preferably carried out using appropriate pressure pumps. The solid components are directly introduced into the lower part of the vessel, preferably through a dip pipe arranged therein. The required reaction temperature and pressure are maintained by a correspondingly controlled—optionally continuous—input of saturated steam. After a certain warm-up phase of the hydrothermal reaction, which can readily be determined by taking samples of the solution formed and measuring their $SiO_2$ concentration, the aluminate—containing solution obtained is continuously run off from the reaction vessel and transferred to the filter.

In the preferred embodiments of the invention, a settling filter is, as already described, used for separating off by filtration the aluminate—containing sodium silicate solution obtained by the process of the invention. According to the invention, the filter medium used for this solids filter—in addition to the filter aids based on aluminum silicate—is preferably the excess of solids of the silicate component already used for the reaction from the completed hydrothermal synthesis, optionally in admixture with excess silicate component from one of the preceding batch reactions or "fresh" silicate component, i.e. silicate component which has not yet been hydrothermally reacted. Accordingly, the silicate component is used in a large excess, not only with respect to the filter sludge used, but also with respect to the desired sodium silicate solution, i.e. the hydrothermal reaction is terminated in such good time that a small part of the main silicate component, amounting to between about 3 and 5%, is still present in solid form. This procedure leads to a particularly high volume/time yield.

To prepare the solids filter, the excess solids settling in the lower part of the reaction vessel are first transferred to the filter bed. Any solid component still remaining in the reaction vessel may be left therein for the following reaction or, alternatively, may be used for preparing the solids filter for one of the following batches.

Before the solution to be filtered is applied, the solids bed of the filter is preferably prepared by a small, circulated quantity of liquid (for example water or even sodium silicate solution) flowing in from beneath in such a way that the fines of the solid components used are floated to the surface of the filter bed and hence form a sufficiently effective filter layer.

In carrying out the filtration process, it has proven to be of particular advantage to apply the solution to the solids filter while it is still hot and under pressure because in this way the entire residual solids are already preheated for the following reaction and the heat content of the hot solution is utilized in an energy-saving manner.

Aluminum hydroxide and silica, for example, may be precipitated in different ways from the aluminate—containing sodium silicate solution obtained in the present process. However, in view of its appreciable aluminum content of up to 0.5% of $Al_2O_3$, it is more economical to directly use the sodium silicate solution, for example, as the silicate component in the production of aluminum silicates, more particularly and preferably zeolitic sodium aluminum silicate of the NaA type.

EXAMPLES

The process according to the invention is illustrated but not limited to the following examples in which the abbreviation "HT" is used for "hydrothermal process". Unless otherwise indicated, the process employed in the examples is that of one of the preferred embodiments carried out as described above.

The examples were carried out both on an industrial scale and, in some instances, also on a laboratory scale for comparison purposes. Three different materials of the type that accumulate on an industrial scale were used as the filter sludges to be utilized in accordance with the invention. For the tests, sufficiently large, representative batches were thoroughly mixed by means of blade stirrers.

The filter aid present in the hydrothermal waterglass filter sludge and in the fusion waterglass filter sludge is a commercially available X-ray amorphous product based on aluminum silicate which has an $SiO_2$ content of 80.6%, an $Al_2O_3$ content of 13.7% and a negligible water content.

The quartz sand used in the examples contained 4.0% of water and, in the solid phase, 99.7% of $SiO_2$ and up to 0.15% of $Al_2O_3$.

Analytical data relating to the composition of the filter sludges are given in Table 1.

(a) HT-Filter Sludge

This is a filter sludge of the type which accumulates in large quantities in the commercial production of sodium silicate solution by the hydrothermal method.

According to estimates based on analytical data, powder photographs and sedimentation measurements, the batch used for the tests given in the following examples contained in the solid phase approximately 65% by weight of sand, approximately 25% by weight of filter aids, approximately 5% by weight of water-soluble sodium silicate (ratio by weight of $SiO_2$ to $Na_2O = 2.0$) from the solution still adhering to the filter sludge despite washing, approximately 5% by weight of heavy metal silicate and other undefined residues from the hydrothermal production process.

(b) Waterglass Filter Sludge

This is the filter sludge of the type which accumulates in the industrial filtration of aqueous solutions of fusion waterglass having the composition $Na_2O \cdot 3.3$–$3.4\ SiO_2$ (in aqueous solution: 27% of $SiO_2$ and 8% of $Na_2O$).

The filter sludge batch used for the tests contained in the solid phase approximately 18% by weight of filter aids and approximately 7% by weight of water-soluble sodium silicate (ratio by weight of $SiO_2$ to $Na_2O = 3.37$) from the solution still adhering to the filter sludge despite washing and a residue of—correspondingly—about 75% by weight of silicates of polyvalent metals and other undefined insoluble residues of the decomposed waterglass accumulating in the course of the waterglass dissolving process.

(c) Molecular Sieve Filter Sludge

This filter sludge is a waste product from the production of molecular sieves. According to analytical data and a powder diffractogram, the batch of filter sludge used for the tests contained only sodium aluminum silicate in the solid phase in the form of a mixture of approximately 80% of hydroxysodalite and 20% of type NaA molecular sieve. On an industrial scale, molecular sieve filter sludge also accumulates inter alia as filter overspill (a suspension of approximately 1% of solids in 10 to 20% sodium hydroxide solution).

TABLE 1

| | | Solids composition[2] | | |
|---|---|---|---|---|
| Filter sludge | % Solids content[1] | % $SiO_2$ | % $Al_2O_3$ | % $Na_2O$ |
| (a) HT-filter sludge | 41 | 87.5 | 4.2 | 6.0 |
| (b) Waterglass filter sludge | 32 | 90.8 | 3.2 | 1.8 |
| (c) Molecular sieve filter sludge | 37 | 42.2 | 34.7 | 23.1 |

[1]Determined by drying at 120° C. and calcination for 1 hour at 800° C.
[2]Determined by X-ray fluorescence analysis.

Examples 1 to 5 were carried out on a laboratory scale for comparison purposes. The reaction vessels used were nickel autoclaves (useful volume 0.2 liter) rotating about their horizontal axis in a heating bath thermostatically controlled at 200°±1° C.

EXAMPLE 1

A reaction mixture of 200 g of 30% aqueous sodium hydroxide solution, 93 g of quartz sand and 5 g of filter aid was reacted for 120 minutes at 200°±1° C. in an autoclave to obtain a complete reaction. The resulting solution did not contain any significant quantities of solids (residue less than 0.1 g) and had a composition of 31.2% of $SiO_2$ and 15.6% of $Na_2O$ (ratio by weight 2.0).

EXAMPLE 2

The procedure was as in Example 1, except that 97 g of quartz sand were used and the hydrothermal treatment was terminated after only 40 minutes. The resulting solution had the same composition as indicated in Example 1, the residual solids containing only quartz sand and hardly any filter aid (aluminum content of the residue less than 0.3% by weight).

EXAMPLE 3

A reaction mixture of 200 g of 30% aqueous sodium hydroxide solution, 96, g of quartz sand and 1.5 g of molecular sieve filter sludge was reacted in an autoclave for 120 minutes at 200°±1° C. The resulting solution did not contain any significant quantities of solids (residue less than 0.1 g) and had the same composition as in Examples 1 and 2, namely 31.2% of $SiO_2$ and 15.6% of $Na_2O$ (ratio by weight 2.0).

Laboratory Examples 1 to 3 show that the filter sludges used react almost completely in the process according to the invention. Examples 4 and 5 demonstrate the importance of using a large excess of silicate in accordance with the invention.

EXAMPLE 4

(Comparison Example)

A mixture of 10 g of filter aid and 200 g of 30% sodium hydroxide solution was reacted for 120 minutes at 200°±1° C. The residue of about 5 g filtered off after the hydrothermal reaction contained 40.6% of $SiO_2$ and 25.3% of $Al_2O_3$. This shows that hardly any $Al_2O_3$ and only a partial quantity of $SiO_2$ dissolves out of the filter aid.

EXAMPLE 5

(Comparison Example)

A mixture of 25 g of molecular sieve filter sludge and 200 g of 30% sodium hydroxide solution was kept at 200°±1° C. for 120 minutes. The residue after this hydrothermal treatment correspond to the starting material in quantity and chemical composition within the limits of analytical accuracy. The filtrate contained less than 0.1% of dissolved $SiO_2$, i.e. the solids present in the molecular sieve filter sludge had not dissolved to any significant extent.

Examples (6a) to (6d) below were carried out on an industrial scale.

A horizontally arranged cylindrical pressure vessel (volume when empty 24 m³) mounted for rotation about its horizontal axis was used as the reaction vessel in Examples (6a) to (6d). Heating was carried out by the direct introduction of saturated steam into the pressure vessel. The rotational speed of the rotating reactor amounted to 6 r.p.m.

The filter sludge accumulating from the solids filter was pumped in the quantities indicated into the sodium hydroxide storage vessel by means of a two-cylinder piston pump. The test arrangement corresponds to that shown and described for FIG. 1.

The quantities of material indicated in Examples (6a) to (6d) were introduced into the reactor which was then closed and rotated. The reaction mixture was heated to 200°±5° C. over a period of 25 to 30 minutes by the direct introduction of steam under a pressure of 20 bars. After a total of 60 minutes rotation, the hydrothermal reaction was terminated, the reaction mixture was expanded to normal pressure to recover energy (preheating of the sodium hydroxide to 90°-95° C. by the vapors formed) and the reaction solution filtered through the solids filter in the presence of fresh filter aid (45 kg per reactor filling).

The filter sludges (a), (b) and (c) described above were used in Examples (6b) to (6d) as shown in Table 2 below. The quantities of sand, sodium hydroxide and filter sludge used and also the characteristics of the sodium silicate solutions resulting after filtration of the reaction mixture are also given in Table 2 below.

TABLE 2

| | Individual Tests on an Industrial Scale | | | | | | |
|---|---|---|---|---|---|---|---|
| | Materials and Quantities Used[1] | | | | | Composition of | |
| Example No. | sand[2] | sodium[3] hydroxide | filter sludge[4] | | | the filtered soln. | |
| | | | (a) | (b) | (c) | % $SiO_2$ | % $Na_2O$ |
| 6 (a) | 6,300 | 12,400 | None | | | 27.0 | 13.5 |
| 6 (b) | 6,165 | 12,400 | 370 | — | — | 26.9 | 13.4 |
| 6 (c) | 6,140 | 12,400 | 370 | 90 | — | 27.0 | 13.4 |
| 6 (d) | 6,165 | 12,400 | 370 | — | 20 | 27.0 | 13.5 |

[1]Quantities in kg per reactor filling (plus steam condensate).
[2]Moisture content 4%.
[3]30% NaOH
[4]For filter sludge description, see text and Table 1).

In the filtration of the batches according to Examples (6a) to (6d) by the described process (addition of 45 g of filter aid per reactor filling), quantities of about 370±10 kg of filter sludge accumulated in each case. The other test conditions are specified in the examples.

EXAMPLE (6a)

No filter sludge was used in this comparison test.

EXAMPLE (6b)

Compared with Example (6a), the quantity of sand used was reduced by 135 kg and, instead, 370 kg of HT filter sludge were added. On completion of the hydrothermal reaction, there remained a suspension of which the solids consisted almost exclusively of the sand used in excess, containing less than 0.3% of $Al_2O_3$.

EXAMPLE (6c)

Compared with Example (6a), the quantity of sand used was reduced by 160 kg and, instead, 370 kg of HT filter sludge were added. On completion of the hydrothermal reaction, there remained a suspension of which the solids consisted almost exclusively of the sand used in excess, containing less than 0.3% of $Al_2O_3$.

EXAMPLE (6c)

Compared with Example (6a), the quantity of sand used was reduced by 160 kg and, instead, 370 kg of HT filter sludge were added together with 90 kg of waterglass filter sludge having the composition described in the foregoing. On completion of the hydrothermal reaction, there remained a suspension of which the solids consisted almost exclusively of the sand used in excess, containing less than 0.3% of $Al_2O_3$.

EXAMPLE (6d)

In contrast to Example (6b), a 30% sodium hydroxide was used which in all (based on a total of 12,420 kg) contained approximately 20 kg of molecular sieve filter sludge of the above composition as filter overspill.

EXAMPLE 7

In this example, the HT-filter sludge was completely recycled into the HT-process ten times under the same conditions as in Example (6b). Due to minor operationally induced variations in the reaction time ($\pm 5$ minutes) and reaction temperature ($\pm 5°$ C.), the filtered sodium silicate solution obtained also showed a slightly fluctuating composition of $26.8 \pm 0.7\%$ of $SiO_2$ and $13.4 \pm 0.4\%$ of $Na_2O$.

The quantities of filter sludge did not increase during the tests, but instead remained at $370 \pm 10$ kg per reactor filling. The aluminum content of the solids increased slowly from an initial value of 4.2% of $Al_2O_3$ (blank value without recycling caused by fresh filter aid) to approximately 6% of $Al_2O_3$ after 10 recyclings.

EXAMPLE 8

The apparatus used in this example was a cylindrical, vertically arranged stationary pressure vessel (volume when empty 3.6 m$^3$) which tapered conically at its lower end and which was equipped with a bypass pipe corresponding to the description given for FIG. 2.

The reaction mixture was heated by the direct introduction of saturated steam under a pressure of 20 bars at the lower end of the pressure vessel.

The filter used and the recycling of the filter sludge correspond to Example 3.

The test arrangement for Example 8 is as shown in FIG. 2.

1450 kg of sand, 3000 kg of a 30% sodium hydroxide heated to 95° C. and 100 kg of HT-filter sludge were introduced into the hot reactor vessel filled with a residue of approximately 50 kg from a preceding batch.

After a reaction lasting 2 hours at 190° to 200° C., followed by expansion to normal pressure, the reaction mixture was filtered. The solution thus obtained contained 25.6% of $SiO_2$ and 12.6% of $Na_2O$.

The solids present in the reaction mixture before addition of the filter aid consisted almost entirely of sand, containing less than 0.3% of $Al_2O_3$.

What is claimed is:

1. A process for the hydrothermal decomposition of aluminum silicates and alkali aluminum silicates with aqueous sodium hydroxide solution in the presence of soluble silicates comprising the steps of:
    (a) forming a reaction mixture of
        (i) an aqueous solution containing from about 20 to about 50% by weight of NaOH,
        (ii) at least one silicate selected from the group consisting of an aluminum silicate and an alkali aluminum silicate, and
        (iii) at least one hydrothermally decomposable silicate component
    wherein the ratio by weight of $SiO_2$ to $Al_2O_3$ in the mixture is at least 30:1, and the ratio by weight of $SiO_2$ to $Na_2O$ in the mixture is at least 1.5:1; and
    (b) heating the reaction mixture at a temperature of from about 180° to about 250° C. under the saturated steam pressure corresponding to said temperature.

2. A process in accordance with claim 1 wherein the silicate component in (a) (iii) is at least one of silica, sand, and an alkali silicate.

3. A process in accordance with claim 1 wherein the temperature in step (b) is in the range of from about 200° to about 210° C.

4. A process in accordance with claim 1 wherein in step (a) (i) the aqueous solution contains from about 25 to about 35% by weight of NaOH.

5. A process in accordance with claim 1 wherein in step (a) the ratio by weight of $SiO_2$ to $Al_2O_3$ is in the range of from about 50:1 to about 150:1.

6. A process in accordance with claim 1 wherein the silicate component in step (a) (iii) is at least one of silica, sand, and an alkali silicate, the temperature in step (b) is in the range of from about 200° to about 210° C., in step (a) (i) the aqueous solution contains from about 25 to about 35% by weight of NaOH, and in step (a) the ratio by weight of $SiO_2$ to $Al_2O_3$ is in the range of from about 50:1 to about 150:1.

7. A process in accordance with claim 1 wherein step (b) is carried out in a rotating cylindrical pressure vessel mounted for rotation about its horizontal axis.

8. A process in accordance with claim 6 wherein step (b) is carried out in a rotating cylindrical pressure vessel mounted for rotation about its horizontal axis.

9. A process in accordance with claim 1 wherein step (b) is carried out in a stationary pressure vessel in which filter sludge is introduced into the pressure vessel which, together with the hydrothermally decomposable silicate component (a) (iii), forms a solids bed; and the liquid phase of the reaction mixture is pump-recirculated by means of a bypass conduit leading from the upper section of the pressure vessel to the lower section thereof, resulting in the formation of a fluidized bed from the solids bed, until the concentration of $SiO_2$ in the liquid phase of the reaction mixture reaches a desired level.

10. A process in accordance with claim 1 wherein the reaction is carried out continuously.

11. A process in accordance with claim 9 wherein the reaction is carried out continuously while continuously removing reaction mixture from the reaction vessel.

* * * * *